Dec. 11, 1956 H. A. LASSWELL 2,773,700
AUTOMATIC TENSION MAINTAINING LOAD BINDER FOR VEHICLES
Filed Jan. 14, 1954 2 Sheets-Sheet 1

INVENTOR
HARRY A. LASSWELL.
BY Robert B. Harmon
ATTORNEY

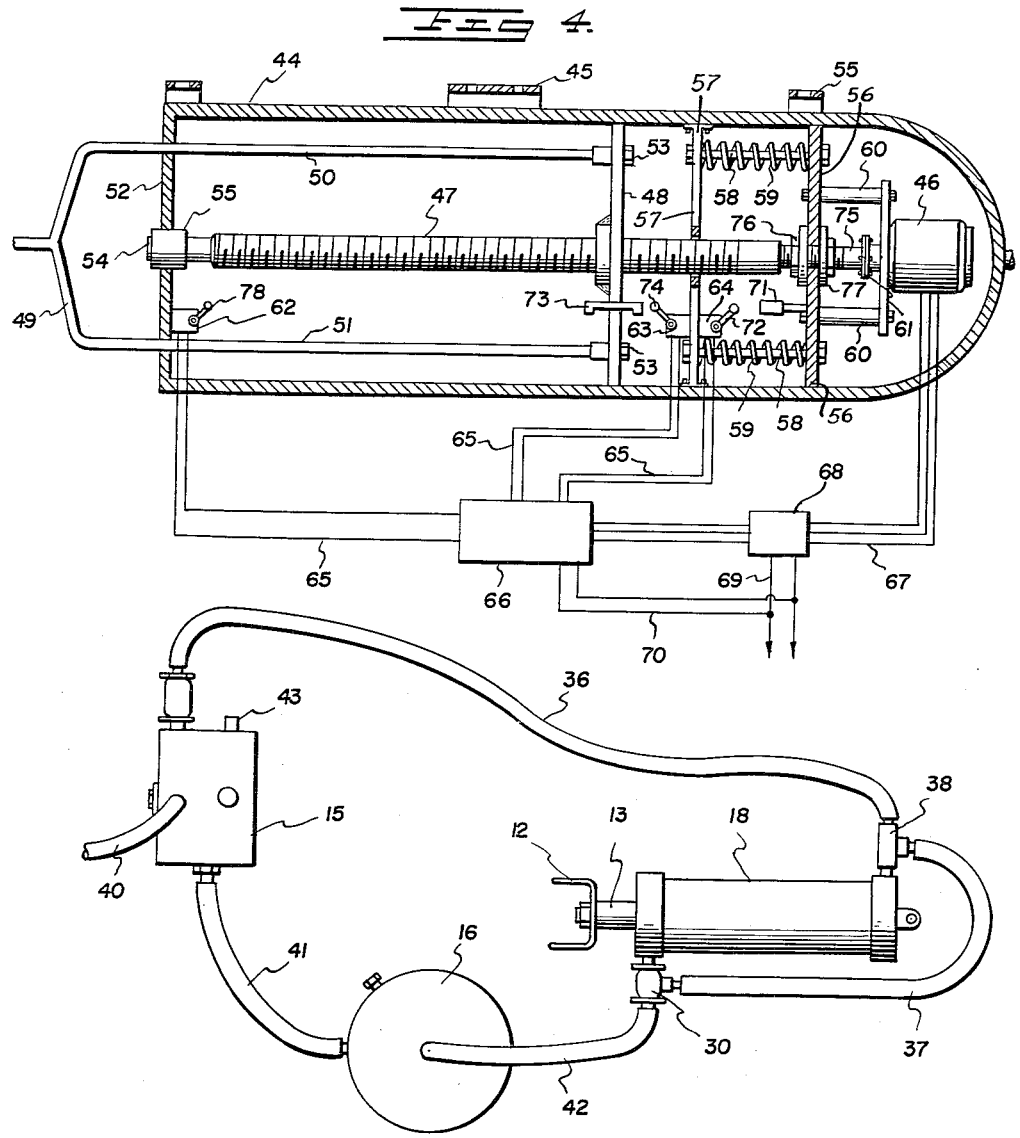

United States Patent Office 2,773,700
Patented Dec. 11, 1956

2,773,700

AUTOMATIC TENSION MAINTAINING LOAD BINDER FOR VEHICLES

Harry A. Lasswell, Little Rock, Ark.

Application January 14, 1954, Serial No. 404,044

15 Claims. (Cl. 280—179)

This invention relates to automatic load binders for land, rail, or water vehicles, which are particularly designed to carry stacked loads such as logs, rails, pipes, and the like.

It is common, in the prior practice of binding loads, to attach one end of a cable of chain to one side of a vehicle to extend the cable over a stacked load, and tie or lock down the other end of said cable to the other side of the vehicle usually by means of a toggle or dogging lever arm. Prior practice, however, has only accounted for the initial loading of the vehicle and no automatic takeup means has been provided to take care of shifting loads resulting in a general loosening of the binder cable. It has been necessary for the truck driver to leave the cab of the vehicle and readjust the binder, thus consuming time and labor.

It is, therefore, the primary object of this invention to provide a load binder which automatically adjusts itself by suitable motive means, after an initial setting, in response to shifting loads carried by the vehicle on which the binder is mounted.

A specific object of this invention is to provide a compact hydraulic system for attachment to a vehicle which is adapted to maintain a desired tension on the cable or chain utilized to hold a load in position on the vehicle.

A more specific object of this invention is to provide a compact hydraulic system for attachment to a vehicle which is adapted to automatically take up the slack in a load binder cable or chain on the vehicle load shift at any time after loading.

Another object of this invention is to provide, in a modified form, an automatic load binder including a pneumatic-hydraulic mechanism to automatically take up the slack in a load binder cable when utilized on that type of vehicle which is provided with a primary or auxiliary air pressure system.

A further object of this invention is to provide, in another modified form, an automatic load binder for vehicles including an electro-mechanical mechanism, to automatically take up the slack in a load binder cable when such slack appears under shifting load conditions.

With the foregoing and other objects in view, the invention resides in the following specification and appended claims, certain embodiments and details of constructions of which are illustrated by the accompanying drawings in which:

Fig. 3 is a diagrammatic view of the various parts of the pneumatic-hydraulic form of this invention and Fig. 4 is a sectional view of the electro-mechanical form of this invention including schematically the electrical circuit utilized therewith.

Figure 1:
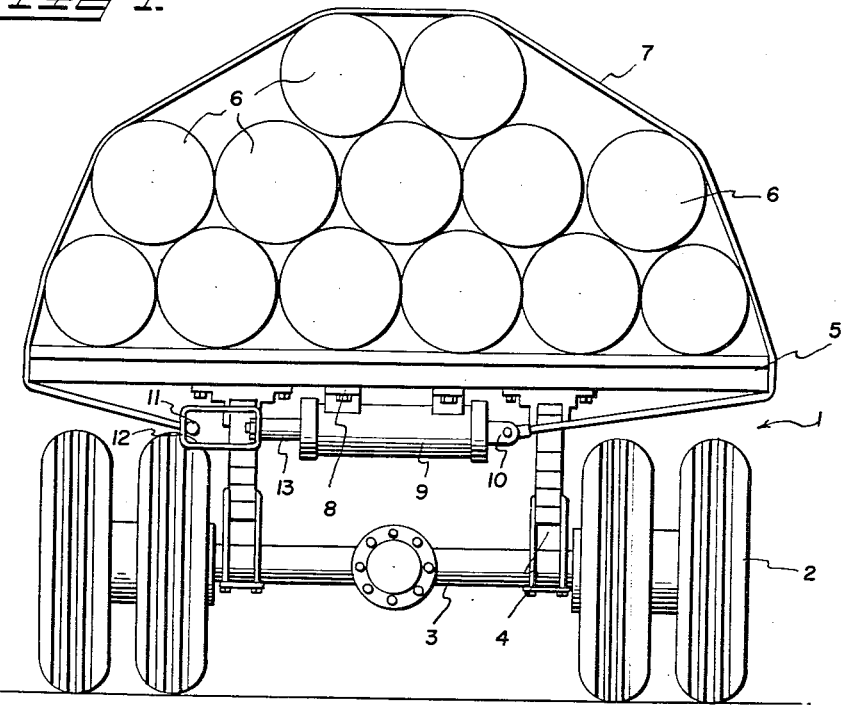
Fig. 1 is a rear view of a road vehicle having the load binder of the invention attached thereto.

Referring more particularly to Fig. 1, it will be seen that a vehicle 1 is provided with the usual wheel 2, axle 3, and spring suspension means 4 on which the loading deck or floor 5 is carried. Carried upon the deck 5 are a plurality of stacked load elements 6 which represent any typical load such as logs, beams, pipes, barrels, etc. Secured by suitable means, such as bolts 8, to the under side of deck 5 is a power cylinder or motive means 9. A clevis 10 is provided at one end of cylinder 9. To clevis pin 10 is secured a load-binding cable or chain 7. The cable 7 may be secured to any stationary point under or at the side of the vehicle.

The cable is illustrated as extending sidewardly of the vehicle from pin 10 and upwardly and looped over the load elements 6. The free end of the cable is provided with a hook 11. The hook 11 is removably secured to a bracket 12 which is attached to reciprocating piston rod 13 of the power cylinder 9.

For purposes of clarity all of the various parts of the hydraulic system are not shown in Fig. 1. They are preferably assembled into a compact structure which is readily attachable to a vehicle. These parts of the system are illustrated diagrammatically in Fig. 2. This system essentially includes a motor-pump combination 14, a four-way valve 15, a sump 16, a pressure switch 17, a power cylinder 18, and a solenoid 19. The remainder of the system is best described by a discussion of its operation.

Assume the vehicle 1 is loaded with elements 6 and that it is desired to bind these elements securely to deck 5. The cable 7 is looped over the elements and hook 11 is attached to bracket 12. The operator then simply closes a switch 20 to operate the motor-pump to take up slack in the cable 7 and places the cable under a predetermined tension. The switch 20 is inserted in one line 21 leading from a battery 22, which may be the vehicle battery, to the solenoid 19. The solenoid 19 is active under certain conditions, to be described, to make or break the circuit between the battery 22 and the motor 14 as represented by line 23. A return line 24 is provided from the motor 14 to the other side of battery 22.

Upon closing of the switch 20, the solenoid 19 is operative to close the circuit in line 23 and the motor-pump 14 operates. The pump portion 25 of the combined motor-pump draws oil or other suitable liquid from sump 16 through line 26 and discharges the liquid through a check-valve 27 into line 28. The four-way valve 15 receives the fluid from line 28 and during the cable tensioning operation is set by a handle (not shown) to direct the fluid through line 29 and pilot-type check valve 30 into power cylinder 18. As the rod 13 is moved to the right in Fig. 2, by means of a piston (not shown) within the cylinder, the cable 7 which is attached to bracket 12 by hook 11 will be tensioned to securely hold the load elements in position. As the tension on cable 7 increases, the pressure in the portion of the hydraulic system, thus far described, builds up rapidly.

In order to obtain a desired tension on the cable, and at the same time prevent failure of the hydraulic system, the invention provides an adjustable cut-off system for the motor 14. Connected in line 28 is a T-fitting 31. To the lateral connection 32 of the fitting 31 is connected a line 33 which in turn is connected at its other extremity to pressure switch 17. Switch 17 is connected electrically by lines 34 and 35 to the solenoid 19 and battery 22 respectively.

When the pressure in the system reaches the pressure setting of the switch 17, the switch will close a circuit through solenoid 19 which then acts immediately to open circuit line 23 to motor-pump 14, thereby stopping the motor. The pressure switch 17 thus acts as a sensing means to render the hydraulic system operative. Practice of the invention has proven to be quite satisfactory for both system and cable at about one hundred pounds per square inch.

Now assuming that either during transit of vehicle 1, or while stopped, the load elements 6 should shift position, a resultant slackening of cable 7 will occur which must be immediately countered in order to avoid possible damage to the vehicle or the load elements and possible loss of said load elements. This invention provides for immediate takeup of this slack automatically. When the slack in the cable 7 occurs, the piston of cylinder 18 will move further to the right, tightening the cable through its connection by rod 13, bracket 12, and hook 11. However, this causes a decrease in pressure in the hydraulic system which would be undesirable if not corrected. Therefore, the pressure switch 17 is set to operate to in turn permit the solenoid 19 to reclose line 23 and place the motor-pump combination in operation. The pressure in the system is quickly reestablished at the upper setting of the pressure switch and the cable 7 is thereby again properly tensioned to hold the load elements 6 securely.

In order to depressurize the system so that the hook 11 may be disconnected from bracket 12, the four-way valve 15 is merely switched so as to connect fluid from pump 25 to line 36. Since there is no pressure in this line, the pressure switch 17 will close to again, through solenoid 19, permit the motor-pump 14 to operate. As pressure builds up to the right of the piston tending to counteract the pressure on the left side, the pressure will also build up in line 37 connected between pilot-check-valve 30 and the T-fitting 38 in line 36.

After an appreciable amount of pressure is developed in line 37 the pilot operator (not shown) of check valve 30 will permit the fluid to the left of the piston in cylinder 18 to pass reversely therethrough into line 29, four-way valve 15, and a line 39 back to sump 16. The piston will move quickly to the left releasing all tension on cable 7, thereby permitting disengagement of hook 11 with bracket 12. Pilot-operated check valves are in common usage, and are well known in the prior art and hence detailed drawings and description thereof are considered unnecessary in the presentation of this invention.

Figure 2:
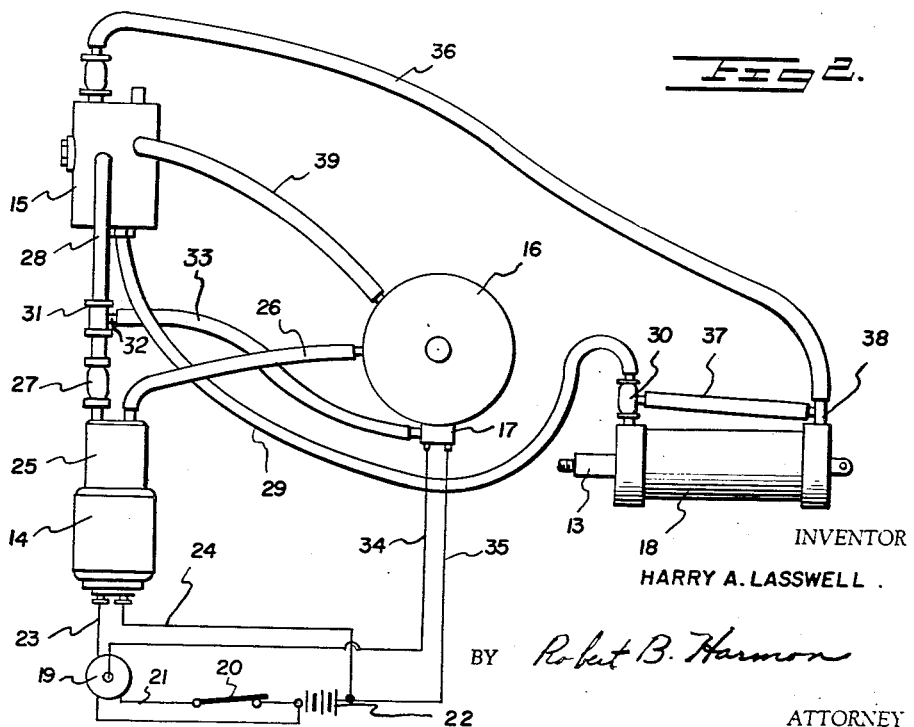
Fig. 2 is a diagrammatic view of the various parts of the hydraulic or preferred embodiment of this invention.

Now referring to Fig. 3, it will be noted that a very simple system is provided which will operate in a manner similar to the system of Fig. 2. The system of Fig. 3, however, is primarily adaptable to vehicles provided with compressed air storage and/or producing means. In the drawing, the four-way valve 15 is connected directly to a source of compressed air (not shown), by a line 40. The sump 16 of this modification contains a substantial supply of liquid, the portion thereof not containing liquid being filled with air.

To initially set the tension on cable 7, the four-way valve is turned to direct air, under pressure, through line 41 to the sump 16. This places the fluid of the sump under pressure. This fluid, under pressure, is directed through a line 42, and check-valve 30 to the left side of the piston of cylinder 18. Obviously, the piston will move to the right pulling rod 13, bracket 12, and hook 11 with it to place the cable 7 under a tension equivalent to the pressure of the air system. In the event of a shift of the load and a resulting slackening of the cable 7, the air-pressure of the system is immediately operative to move the piston further to the right in cylinder 18 to take up the slack and secure the load elements 6.

To permit disengagement of hook 11 from bracket 12 when utilizing the system of Fig. 3, the four-way valve 15 is shifted to direct the air under pressure into line 36, through T-fitting 38 and into the cylinder 18 to the right side of the piston therein. Line 37, as in the system of Fig. 2, is connected to the pilot operated check valve. Therefore, as the pressure in lines 36 and 37 and within the cylinder to the right of the piston builds up, the check valve pilot will operate to permit the fluid to the left of the piston to move reversely through the check valve 30 and line 42 back to sump 16. In order to prevent a pressure lock in either part of the system, the four-way valve 15 is provided with a vent to atmosphere at 43, which is operative to relieve the unwanted pressurized air. Obviously then, the bracket 12 will be moved to the left releasing hook 11 and cable 7.

Referring now to Fig. 4, another modification of the invention is illustrated and comprises an electromechanical mechanism for automatically tensioning a load binder cable. This mechanism consists primarily of a casing 44 with vehicle mounting brackets 45, a reversible electric motor 46, and an actuating screw 47. Threadably carried on the screw 47 within casing 44 is a steel plate 48. Attached to plate 48, by nuts 53, is a bracket 49 having legs 50 and 51 slidably extending through the end wall 52 of casing 44. The end 54 of screw 47 is slidably carried in a bearing 55 mounted in the end wall 52 of the casing.

The plate 48 is prevented from rotating within casing 44 by means of the bracket 49 and a guide track (not shown). A second longitudinally movable plate 56 is slidably mounted within casing 44 about the reduced portion 75 of shaft 47. Plate 56 is restrained from longitudinal movement by suitable thrust bearings 76 and nuts 77, which are threaded on to the reduced portion 75 of the shaft 47. Plate 56 is prevented from rotating by suitable guide track means, not shown in the drawings.

Between the two plates 48 and 56 is a plate 57 which is welded or otherwise secured to the interior of casing 44. Extending through plates 57 and 56 are a plurality of bolts 58, each being surrounded by a compression coil spring 59, which extends between the facing walls of the plates. Secured by suitable mountings 60 to plate 56 is the reversible electric motor 46. The motor is connected in driving relation with screw 47 by a suitable coupling 61.

The system of Fig. 4 is further provided with a limit switch 62 mounted interiorly of the end wall 52. Limit switches 63 and 64 are mounted on opposite sides of plate 57. Switches 62 and 63 are utilized to prevent possible over travel of plate 48 during operation of the mechanism. Switch 64 limits the operation of motor 46 to a preset tensioning of springs 59, as will be later described. The switches 62, 63 and 64 are connected by suitable independent lines 65 to a master switch 66 which has three positions, namely: "off," "on" and "reverse." The motor 46 is connected by lines 67 through a solenoid-operated double throw switch 68 to switch 66.

The solenoid 68 has leads 69 to a source of current, not shown. The switch 66 likewise has leads 70 connecting to the same source of current.

The operation of the system of Fig. 4 will now be described. The switch 66 is moved to the "reverse" position causing current to flow through normally closed limit switch 62 and solenoid 68 to the motor 46. The motor rotates in a direction to move plate 48 along screw 47 to the extreme left of casing 44. The left end of a projection 73, mounted on and extending through plate 48, engages operating lever 78 of switch 62 when the plate approaches wall 52, opening the circuit to the motor and hence stopping the drive.

In a like manner the movement of plate 48 to the right is stopped by projection 73 engaging lever 74 of switch 63 to open circuit the motor. The load binder cable 7 is then secured to bracket 49 with as much slack as possible being taken up manually. The switch 66 is then moved to the "on" position and current will flow through normally closed switches 63 and 64 and the double throw solenoid switch 68 to motor 46. The motor thus energized will drive the plate 48 to the right on screw 47. As tension is increased on the cable due to its connection through bracket 49 to plate 48, the springs 59 become compressed under the action of plate 56. In other words, the plate 56, together with screw 47, moves to the left and in so doing the springs 59 are compressed between movable plate 56 and stationary plate 57.

When a desirable tension is obtained on the binder cable the unit is pre-adjusted to cut off by means of an inwardly directed projection 71 from plate 56 engaging lever 72 of switch 64 to open that switch and thereby stop the motor.

The motor 46 will not operate as long as switch 64 is open, but is instantly ready to operate should that switch be permitted to return to its normally closed position. Now, assuming that the tension on the cable 7 decreases due to a shift in the load, then the screw 47 and plates 48 and 56 would all be moved to the right under the action of springs 59 the spring thus acting as a sensing means for the structure. This movement would then disengage projection 71 from switch lever 72 and switch 64 would immediately reclose. This reclosing of switch 64 re-energizes motor 46 to drive the plate 48 further to the right along screw 47 to automatically take up the undesirable slack in cable 7. Obviously, when such slack is removed and the cable again is under proper preselected tension, the switch 64 will again be operated to stop the motor.

To release the cable 7 it is merely necessary to move the master switch to the reverse position so that motor 46 will drive screw 47 in the direction to move plate 48 far enough so that the cable 7 may be manually disconnected from bracket 49.

It is, therefore, seen that this invention in each of its various forms accomplishes a very desirable result in providing automatic tensioning mechanism for load binder cables. It is realized that the invention may be practiced in various structural forms and that many modifications of the structure illustrated and described herein are obviously possible.

I claim:

1. A load binder for a vehicle comprising means to tie a load to the vehicle, means to automatically maintain a selected tension on said tying means, and sensing means responsive to a decrease in tension on the tying means below a preset level to render said automatic means operative.

2. A load binder for a vehicle comprising a cable to tie a load to the vehicle, means to automatically maintain a selected tension on said cable, and sensing means responsive to a decrease in cable tension below a preset selected level to render said cable tensioning means operative.

3. A load binder for a vehicle comprising means to tie a load to the vehicle, hydraulic means to automatically maintain a selected tension on said tying means, and sensing means responsive to a decrease in tension on said tying means below a preset level to render said hydraulic means operative.

4. A load binder for a vehicle comprising means to tie a load to the vehicle, electro-mechanical means to automatically maintain a selected tension on said tying means, and sensing means responsive to a decrease in tension on the tying means below a pre-set level to render said electro-mechanical tensioning means operative.

5. A load binder for a vehicle comprising means to tie a load to the vehicle, hydraulic means to initially place said tying means under a desired tension and to automatically re-establish said tension, and sensing means responsive to a decrease in tension on said tying means below the desired preset level to render said hydraulic means operative.

6. A load binder for a vehicle comprising means to tie a load to the vehicle, electro-mechanical means to initially place said tying means under a desired tension and to automatically re-establish said tension in response to a slackening in said tying means, and sensing means responsive to a decrease in tension on the tying means below a pre-set level to render said electro-mechanical tensioning means operative.

7. A load binder in combination with a vehicle comprising a cable for tying a load to the vehicle, said cable being fixedly held to the vehicle at one end, the free end thereof being looped over the load on the vehicle, means connected to the free end of said cable and to the vehicle to place an initial tension on the cable and to automatically re-establish said tension, and sensing means responsive to a decrease in cable tension below a preset level to render said tensioning means operative.

8. A load binder in combination with a vehicle comprising a cable for tying a load to the vehicle, said cable being fixedly held to the vehicle at one end, the free end thereof being looped over the load on the vehicle, hydraulic means connected to the free end of said cable and to the vehicle to place an initial tension on the cable and to automatically re-establish said tension, and sensing means responsive to a decrease in cable tension below a preset level to render said hydraulic means operative.

9. A load binder in combination with a vehicle comprising a cable for tying a load to the vehicle, said cable being fixedly held to the vehicle at one end, the free end thereof being looped over the load on the vehicle, electro-mechanical means connected to the free end of said cable and to the vehicle to place an initial tension on the cable and to automatically re-establish said tension in response to any slack occurring in said cable, and sensing means responsive to a decrease in tension on the cable below a pre-set level to render said electro-mechanical means operative.

10. A load binder in combination with a vehicle comprising motive means including a casing connected to the vehicle, a cable being secured at one end to said casing and being looped over the load on the vehicle so that its free end is releasably attachable to said motive means, said motive means being operative to place a predetermined tension on said cable to hold the load securely on the vehicle and being automatically operative to re-establish the predetermined tension on the cable, and sensing means responsive to a decrease in cable tension below a preset level to render said motive means operative.

11. A load binder in combination with a vehicle comprising hydraulic means including a casing connected to the vehicle, a cable being secured at one end to said casing and being looped over the load on the vehicle so that its free end is releasably attachable to said hydraulic means, said hydraulic means being operative to place a predetermined tension on the cable to hold the load securely on the vehicle and being automatically operative to re-establish the predetermined tension on the cable, and a sensing means responsive to a decrease in pressure in the hydraulic means, as determined by said cable tension, below a preset level to render said hydraulic means operative.

12. A load binder in combination with a vehicle comprising electro-mechanical means including a casing connected to the vehicle, a cable being secured at one end to said casing and being looped over the load on the vehicle so that its free end is releasably attachable to said electro-mechanical means, said electro-mechanical means being operative to place a predetermined tension on said cable to hold the load securely on the vehicle and being automatically operative to reestablish the predetermined tension on the cable in response to any slackening of said cable, and sensing means responsive to a decrease in tension on the cable below a pre-set level to render said electro-mechanical means operative.

13. A load binder in combination with a vehicle including a floor, a hydraulic power cylinder including a piston and piston rod connected to the underside of said floor, a cable secured at one end to the one side of the floor of the vehicle and being looped upwardly over a load on the floor of the vehicle with the free end thereof extending downwardly to a releasable connection with the piston rod of said power cylinder, means to supply fluid under pressure to one side of said piston to move said piston and thereby place the cable under a predetermined tension, sensing means responsive to a decrease in pressure in said fluid supply means, as determined by said cable tension, below the predetermined tension, to render said fluid supply means operative to re-establish the predetermined tension, and means to supply fluid to the other side of said piston to simultaneously release the pressure fluid from the first side of said piston and to move the piston in the opposite direction to relax the tension on the cable.

14. A load binder in combination with a vehicle including a floor, a casing secured to the underside of said floor, electro-mechanical drive means supported in said housing, a bracket connected to the drive means and extending through a wall of the housing, a cable secured at one end to one side of the floor of the vehicle and being looped upwardly over a load on the floor of the vehicle with the free end thereof extending downwardly to a releasable connection with the bracket, means to energize said drive means to move said bracket to place the cable under a predetermined tension or to release the tension on the cable, and means to automatically energize the drive means to re-establish the predetermined tension on the cable in response to slackening of said cable.

15. A load binder in combination with a vehicle including a floor, motive means connected to the vehicle, a cable connected at one end to the vehicle and being looped over a load on the floor of the vehicle with the free end of said cable being releasably secured to the motive means, manual means to actuate said motive means to place said cable under tension, means to automatically control the motive means in order to obtain a predetermined tension in the cable, automatic sensing means responsive to slackening in said cable to re-actuate said motive means to re-establish the predetermined tension in the cable, and means initially controlled by said manual means to actuate said motive means in reverse to relieve the tension on the cable.

References Cited in the file of this patent

UNITED STATES PATENTS

| | | |
|---|---|---|
| 1,104,579 | Thorsby | July 21, 1914 |
| 1,245,607 | Maxwell | Nov. 6, 1917 |
| 1,892,130 | Benson | Dec. 27, 1932 |
| 2,472,623 | Schulze | June 7, 1949 |
| 2,559,185 | Carroll | July 3, 1951 |
| 2,661,631 | Myers | Dec. 8, 1953 |